March 6, 1962  J. R. BENFORD  3,023,504
RETICLE FOR SIGHTING INSTRUMENTS
Filed Sept. 1, 1960

INVENTOR.
JAMES R. BENFORD
BY
*Frank C. Parker*
ATTORNEY

United States Patent Office 3,023,504
Patented Mar. 6, 1962

3,023,504
RETICLE FOR SIGHTING INSTRUMENTS
James R. Benford, Irondequoit, N.Y., assignor to Bausch & Lomb Incorporated, Rochester, N.Y., a corporation of New York
Filed Sept. 1, 1960, Ser. No. 53,432
6 Claims. (Cl. 33—50)

This invention relates to reticles for sighting instruments, particularly telescopes, and is more particularly concerned with an improvement in tapered reticles for such instruments.

In my prior Patent No. 2,800,718, there is disclosed a reticle for variable power sighting instruments comprising a plurality of tapered indicia which meet at a common point on the optical axis of the instrument, thereby providing a reticle which appears to be of substantially the same shape and size regardless of the degree of magnification being provided at the time by the instrument.

The present invention also relates to tapered reticles but is more particularly concerned with the provision of an improved reticle utilizing a plurality of twisted ribbons which appear to taper to a common point approximately on the optical axis of the instrument.

The principal object of the present invention is therefore to provide an improved reticle for sighting instruments comprising a plurality of twisted ribbons made of material which at least partially prevents the passage of light rays therethrough in order to provide a reticle which appears substantially the same whether the telescope in which the reticle is being used is at low magnification or at high magnification.

A principal advantage of the present invention stems from the economies of manufacture which may be effected by the use of such reticles.

The foregoing and other objects and advantages of the present invention will become more apparent from the following detailed description when read in conjunction with the accompanying drawing, wherein.

Figure 1:
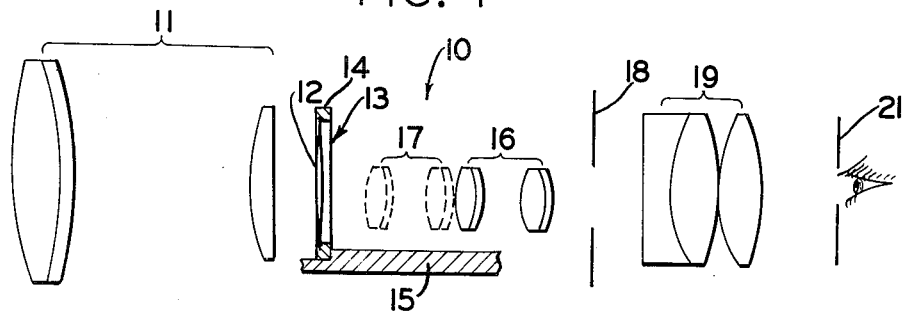
FIG. 1 is a diagrammatic view of a variable power telescope embodying one form of the present invention.

With reference now to FIG. 1 of the drawings, one form of the invention is shown as being embodied in the variable power gun sighting telescope 10. The telescope 10 includes an objective lens group 11 which focuses an image of the target area or field at a front surface 12 of a reticle 13. The reticle 13 will be described in greater detail hereinafter and comprises an outer ring 14 which seats against a casing or barrel 15. To the rear of the reticle 13 there is a suitable erector lens 16 which is movable longitudinally within casing 15 in order to vary the power or magnification of the telescope. The dotted lines 17 represent the forward or high power position of the erector lens system 16 and the solid lines represent the low power position. An image of the target and reticle is relayed by the erector lens 16 to a focal plane 18 where it is viewed through an eyepiece 19 by the operator's eye located at the exit pupil 21 of the telescope 10.

Figure 2:
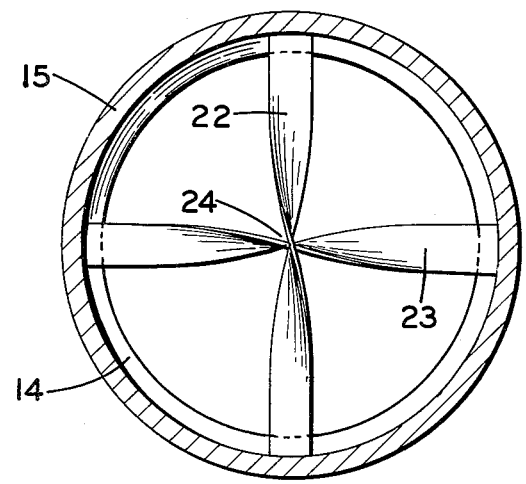
FIG. 2 is an enlarged view of a preferred form of reticle comprising the subject matter of the present invention.

According to the present invention, the front surface 12 of the reticle 13 is disposed at a focal plane of the instrument and the reticle 13, as already stated, comprises a support ring 14. The reticle 13 in FIG. 2 also includes a pair of strips of material, designated by reference numerals 22 and 23, each of which strips 22 and 23 is fastened at its outer periphery to the front face of ring 14. Each of the strips 22 and 23 is twisted from end to end through substantially 180° in order to present its edgewise dimension to the field of view at the substantial midpoint of each strip. By locating the strips 22 and 23 so that they precisely bisect the reticle support ring 14, the strips 22 and 23 appear to intersect substantially at a point 24 which lies substantially on the optical axis of the telescope system. As is apparent from FIG. 2, the wide dimension of the strips or ribbons 22 and 23 is in the field of view at the periphery of the reticle so that the over-all effect is that the reticle appears to comprise a plurality of portions each of which tapers toward the center to meet at the common point 24.

The advantage of the taper in the reticle design is that the reticle appears to be of substantially the same size regardless of the degree of magnification being provided at the moment by the telescope.

It has been found in telescopic instruments having reticles constructed in accordance with this invention that there is no appreciable degree of parallax which might be suspected due to the fact that either strip 22 or 23 must be slightly displaced axially at the point of intersection thereof.

Figure 3:
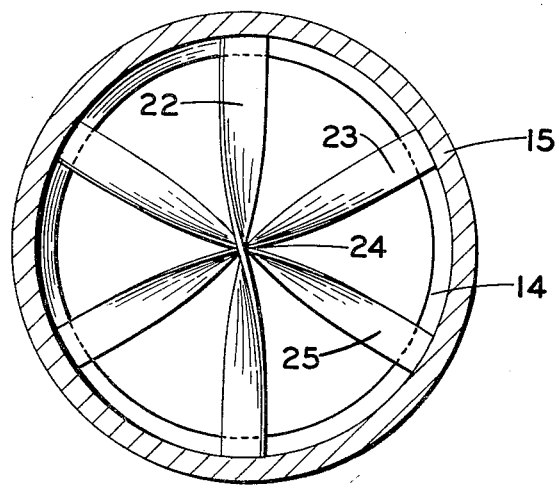
FIG. 3 is a view similar to FIG. 2 but showing a slightly modified form of reticle.

Turning now to FIG. 3, a slightly modified form of the invention is disclosed. In this form of the invention there are provided three intersecting strips 22', 23' and 25', all of which appear to intersect at the common point 24' on the optical axis of the instrument. Otherwise this form is like that shown in FIG. 2.

It is contemplated that modifications of the present invention can be made without departing from the spirit or scope thereof.

What is claimed is:

1. A reticle for disposition substantially in the focal plane of the optical system of a sighting instrument and comprising a plurality of ribbon-like strips of material which at least partially prevents the passage of light rays therethrough, each of said strips being disposed approximately in said focal plane and extending thereacross and being substantially uniformly twisted approximately 180° from end to end, whereby to present the flat sides of said strips at the ends thereof and the edgewise dimension of the strips at the approximate midpoints thereof such that said strips all appear to taper to apices which meet at a common point.

2. A reticle for disposition substantially in the focal plane of the optical system of a sighting instrument and comprising at least two ribbon-like strips of material which at least partially prevents the passage of light rays therethrough, each of said strips being disposed approximately in said focal plane and extending thereacross and being substantially uniformly twisted approximately 180° from end to end, whereby to present the flat sides of said strips at the ends thereof and the edgewise dimension of the strips at the approximate midpoints thereof such that said strips all appear to taper to apices which meet at a common point.

3. A reticle for disposition substantially in the focal plane of the optical system of a sighting instrument and comprising a plurality of ribbon-like strips of material which at least partially prevents the passage of light rays therethrough, each of said strips being secured to a mounting member disposed in the substantial focal plane and lying substantially concentrically around the optical axis of the instrument, each of said strips being stretched across said mounting member and being substantially uniformly twisted approximately 180° from end to end, whereby to present the flat sides of said strips at the ends thereof and the edgewise dimension of each strip at the approximate midpoint thereof such that the strips all appear to taper to apices which meet at a common point.

4. A reticle for disposition substantially in the focal plane of the optical system of a sighting instrument and comprising a plurality of ribbon-like strips of material which at least partially prevents the passage of light rays therethrough, each of said strips having an end disposed so as to present a flat side thereof at the periphery of the focal plane and the strips being substantially uniformly twisted approximately 90° between said end and the center of the reticle to thereby present the edgewise dimensions of the strips at the center of the reticle, whereby the strips all appear to taper from the periphery of the reticle to apices at the center which meet a a common point.

5. A variable power telescope system for a sighting instrument having in combination a sighting reticle located substantially in the focal plane of the system, said reticle comprising a plurality of ribbon-like strips of material which at least partially prevents the passage of light rays therethrough, each of said strips having an end disposed so as to present a flat side thereof at the periphery of the focal plane and the strips being substantially uniformly twisted approximately 90° between said end and the center of the reticle to thereby present the edgewise dimensions of the strips at the center of the reticle, whereby the strips all appear to taper from the periphery of the reticle to apices at the center which meet at a common point and the strips appear to have substantially the same size and shape for all magnifications of the telescope system.

6. A variable power telescope system for a sighting instrument having in combination a sighting reticle located substantially in the focal plane of the system, said reticle comprising a plurality of ribbon-like strips of material which at least partially prevents the passage of light rays therethrough, each of said strips extending across the substantial focal plane of the telescope system and being substantially uniformly twisted approximately 180° from end to end so as to present the flat sides of the strip at the ends thereof and the edgewise dimensions of the strips at the approximate midpoints thereof such that said strips all appear to taper to apices which meet at a common point on the optical axis of the telescope system, whereby the strips appear to have substantially the same size and shape for all magnifications of the telescope system.

No references cited.